United States Patent [19]

Black

[11] Patent Number: 5,704,250

[45] Date of Patent: Jan. 6, 1998

[54] BALL SCREW DRIVE WITH DYNAMICALLY ADJUSTABLE PRELOAD

[75] Inventor: James E. Black, Shelby Township, Mich.

[73] Assignee: Western Atlas, Inc., Warren, Mich.

[21] Appl. No.: 626,273

[22] Filed: Apr. 4, 1996

[51] Int. Cl.⁶ .............................. F16H 25/20; F16H 57/12
[52] U.S. Cl. .................. 74/424.8 B; 74/89.15; 74/441; 318/48; 318/625; 318/630
[58] Field of Search ..................... 74/424.8 B, 441, 74/89.15; 318/40, 48, 611, 625, 630

[56] References Cited

U.S. PATENT DOCUMENTS

| | | |
|---|---|---|
| 2,588,165 | 3/1952 | Rossmann . |
| 3,434,025 | 3/1969 | Parkinson et al. ............ 318/48 X |
| 3,802,281 | 4/1974 | Clarke ........................ 74/89.15 |
| 4,019,616 | 4/1977 | Thorne ..................... 74/424.8 R |
| 4,557,156 | 12/1985 | Teramachi ..................... 74/459 |
| 4,916,963 | 4/1990 | Takei ........................ 74/424.8 B |
| 5,146,802 | 9/1992 | Yanagisawa ............... 74/424.8 R |
| 5,540,113 | 7/1996 | Takei ........................ 74/424.8 B |

FOREIGN PATENT DOCUMENTS

| | | | |
|---|---|---|---|
| 61-246814 | 11/1986 | Japan | ..................... 318/630 |
| 5-332416 | 12/1993 | Japan | ................. 74/424.8 B |

OTHER PUBLICATIONS

Machine Design—Feb. 7, 1994—p. 28.

Primary Examiner—Allan D. Herrmann
Attorney, Agent, or Firm—Barnes, Kisselle, Raisch, Choate, Whittemore & Hulbert

[57] ABSTRACT

A threaded ball screw is stationarily non-rotatably mounted in a machine tool to extend parallel to the line of action traversed by a carriage. A pair of threaded ball nuts are laterally restrained in and mounted for free rotation thereof in a drive mechanism of the carriage and threadably and concentrically engage the ball screw in laterally spaced apart co-axial relationship therealong. A pair of digitally controlled electric drive motors are mounted in the carriage for individually imparting rotational torque to the nuts. A conventional programmably CNC controller is programmed to synchronously control both motors for causing the ball nuts to conjointly produce computer controlled linear motion and positioning of the carriage along the stationary ball screw, and to develop anti-backlash pre-load forces between the ball nuts relative to the ball screw. The system can also produce an electromotive and/or frictional braking force for decelerating and/or holding the carriage in a selected stationarily fixed position along the line of action. The two motor rotors can exert rotational torque on the ball nuts simultaneously in the same or opposite rotary directions with the carriage moving and/or stationary. Pre-load forces exerted between the ball nut can be dynamically adjusted by monitoring the load and/or position of each of the motor rotors and adjusting the power input thereto individually while producing conjoint rotary motion of the motors to drive the carriage along the ball screw. The angular phase relationship between the motor rotors and hence between the ball nuts can be controlled to vary screw-to-nut backlash clearance as a function of carriage travel position and/or mode of machine tool operation.

28 Claims, 5 Drawing Sheets

BALL SCREW DRIVE WITH DYNAMICALLY ADJUSTABLE PRELOAD

FIELD OF THE INVENTION

The present invention relates to drive systems with devices for converting rotary motion into rectilinear motion, and more particularly to rotary-to-linear converters of the type having a worm screw and a ball nut with a set of anti-friction balls rollably engaged between their opposed screw threads to translate the rotation of either into linear travel of the other.

BACKGROUND OF THE INVENTION

Rotary-to-linear converters of the worm-and-ball-nut type, also referred to as the recirculating ball type in the art, convert sliding friction into rolling friction by virtue of their rolling balls. Because of the minimal frictional resistance between the mating parts, the devices of this class have found extensive use in feed mechanisms of machine tools and other pieces of machinery such as in instruments for inspection or measurement, work tables for holding work to be machined, robotic heads, etc. For example, conventional CNC multi-axis machines utilize at least two perpendicular ball screws for each X-Y positioning axis of the machine work table. As each ball screw rotates, the changing positions of the ball nuts determine the position of a table-fixtured workpiece being moved. For machine tools equipped with multi-machining heads, such as drill heads, various combinations of rotatably driven ball screws and stationarily mounted non-rotatable ball screws with power driven rotatable ball nuts traveling therealong have been provided for efficiently performing complex machining functions.

One example of such prior art machines is a four ball screw, nine-axis machine designed as an eight-head machine for drilling holes in office furniture panels as set forth on page 28 of the Feb. 7, 1994 issue of *Machine Design*. In this system two parallel stationary ball screws are non-rotatably held on a frame which in turn travels in the Y direction on two parallel rotating ball screws. Six drill heads are mounted on one of the non-rotary screws, and two larger drill heads on the other. Each drill head assembly is bearing-mounted on a ball nut and carries a servo motor which rotates the ball nut via a timing belt drive. Because the ball screw is non-rotatable, the head travels back and forth as the nut rotates, the head being supported and guided by suitable stationary guide rails. Each of the eight heads is under CNC-control to move independently in the X direction. An external flexible rack wiring system provides electrical connections to the traveling drive motors to enable the associated power leads to follow their respective paths of travel.

In such systems as well as those set forth in U.S. Pat. No. 4,557,156 it is often preferred to thus support the drive motor on the moving part and to mount the worm stationary so as to be securely fixed in position and held against rotation. This avoids problems arising in drive systems employing a rotatable worm to produce axial movement of the ball nut and the object coupled thereto wherein the critical rotational speed of the worm must be avoided, i.e., the angular speed at which the worm becomes dynamically unstable and produces "whip" with large lateral amplitudes due to resonance with natural frequencies of worm lateral vibration. In such systems, the worm must therefore be revolved at some safe margin less than the critical speed, thereby setting a limit on quick feed of the object. However, mounting the drive motor on the moving object and causing the motor to rotate the ball nut on the non-rotational stationary screw obviates this problem.

In such ball screw feed systems it has also been proposed to provide "integrated drives" in which the ball screw nut is drivingly coupled directly to the rotating armature of the electric drive motor rather than transmit the driving force of the motor indirectly to the ball nut via gear trains, belt drives or the like. This overcomes the problems of excessive moving mass and difficulty in obtaining accurate positioning due to the bulk and backlash inherent in such indirect drive systems. Such integrated motor drive and ball screw mechanism mounted to the moving table or other moving object are disclosed in U.S. Pat. No. 4,019,616 and 4,916,693, which are incorporated herein by reference.

These integrated motor rotor/ball nut designs are also more compact because there is no outboard or exteriorly located motor or similar drive mechanism that takes up additional space within the machine frame. By utilizing a stationarily mounted ball screw, the axial translatory moment of inertia of the ball screw is eliminated in the system because the ball screw does not move bodily. Such systems also require fewer bearings and do not require alignment of a drive coupling mechanism between the motor and ball screw for proper transmission of torque, thereby simplifying the structure and reducing cost and servicing difficulties.

Moreover the ball screw is much more rigid in torsion at its weakest point, assuming equal length and diameters, as compared to those in which the lead screw is rotatably driven. The ball screw also is twice as rigid in deflection due to the anchoring its ends in a stationary frame as compared to the rotatably driven lead screw type of design. Hence the drive system can better handle rapid acceleration and deceleration of the mass mounted on the moving table, whether it be a machine head or work fixture.

Such integrated rotor/ball nut units can use economical conventional frameless motors with permanent magnet rotors which provide high torque-to-weight and inertia ratios. The stationary outer field winding may be mounted in an electrical field shielding casing in turn affixed to the moving table or other moving framework, with the ball nut being direct rotatably driven by the rotating inner permanent magnet rotor. The windings are thus encapsulated for protection from harsh environments, and built-in Hall effect devices can be utilized for electronic commutation. Such motors can be of the sequence pulse/rotary stepping servo type so that accurate control over the degree of rotation is produced when the windings are properly pulsed. Alternatively, the usual induction type drive motors can be used for continuous run applications.

Despite the many aforementioned advantages of such known integrated traveling motor ball screw drive systems, one problem which remains both with these systems as well as with ball screw drives in general is the axial play or backlash between the worm and ball nut. Such backlash causes uneven wear, noise and poor response when either the worm or the ball nut starts traveling axially upon rotation of the other.

One conventional remedy for this defect has been to split the ball nut into a pair of halves, along a plane normal to its axis, and to place an intermediate ring therebetween for preloading the two groups of balls on its opposite sides either toward or away from each other. This splitting of the ball nut necessitates, of course, the reinforcement of the ball nut assembly including the intermediate ring, thus making costly and difficult the manufacture and assembly of the device.

Of course, preloading of the worm and ball nut to eliminate axial play or backlash therebetween can also be accomplished with typical adjustment end nuts as disclosed in the aforementioned U.S. Pat. No. 4,019,616. However, this involves extra structure and complications in assembly and in the fine mechanical adjustment needed to minimize end play in the assembly. Such adjustment nut structures are also subject to loss of precision during use and operation for extended periods due to wear and vibration of the various components of the ball screw and worm drive assembly.

Another approach to this nut-to-ball screw backlash problem is set forth in the aforementioned U.S. Pat. No. 4,557,156 in which two separate groups of anti-friction balls are provided and the ball nut has two bypass cross cuts formed in axially spaced, diametrically opposite positions thereon to allow these two separate groups of balls to recirculate each along one turn of the helical groove in the ball nut. One turn of the helical groove in the ball nut, located between the separate spaced groove turns for the two groups of balls, is made different in width from the other turns, with the result that the two groups of balls are preloaded in the opposite axial directions of the ball nut. However this solution also requires a more complicated and costly ball nut construction in order to provide preload between the worm and ball nut, and hence does not permit the integrated traveling motor drive system to take advantage of the economies available in utilizing standard shelf item ball screw and nut components.

OBJECTS OF THE INVENTION

In the light of the aforementioned difficulties with the complexity, expense, mass, inertia and wear problems inherent in the mechanical designs heretofore utilized for overcoming the problem of axial play or backlash between the worm and ball nut in such ball screw drive systems, it is an object of the present invention to provide an improved method and apparatus for driving and preloading ball screws in which the preloading can be dynamically adjusted while the mechanism is operating, which reduces the mechanical complexity and difficulty of manufacture and assembly, which reduces the associated close mechanical tolerances and number of mechanical parts in which frictionally generated heat and wear is significantly reduced and system accuracy, life and efficiency is greatly improved.

Another object of the present invention is to provide an improved ball screw drive system of the aforementioned character of rigid design and reduced moment of inertia, and which also provides the aforementioned advantages of the integrated ball nut and motor rotor design utilizing the stationarily mounted non-rotatable worm screw and electronically controlled table mounted drive unit so that improved positioning can be obtained with a minimum amount of wear and minimum transverse oscillation, thereby also increasing production cycle through-put by reducing delay times in the drive mechanism.

A further object is to provide an improved method of driving and preloading ball screw drives of the aforementioned character which eliminates the need for any separate brake mechanism for stopping and holding the table or ball nuts.

Still another object is to provide an improved method of driving and preloading ball screw drives which is capable of applying higher peak power or torque to the ball nuts to move the table then hitherto possible with prior ball screw drive systems.

SUMMARY OF THE INVENTION

By way of summary description and not by way of limitation, the foregoing and other objects of the invention are achieved by providing an improved ball screw drive mechanism and associated method and system for controlling operation of the same as applied, for example, to controlling linear motion of a tool head carriage, workpiece fixture table part or similar moving element for a machine tool. In the disclosed embodiment the machine tool has a movably mounted carriage for carrying an operative machine tool working element along a line of action within said machine tool. A suitable carriage guide movably supports the carriage while permitting motion of the same in a direction parallel to the line of action.

A threaded ball screw is fixedly non-rotatably mounted in the machine tool parallel to and at least coextensive with the line of action to be traversed by the carriage. A pair of threaded ball nuts are laterally restrained in and mounted for free rotation thereof in a carriage drive mechanism, the ball nuts being mounted in the drive mechanism to threadably and concentrically engage the ball screw in laterally spaced apart co-axial relationship therealong. The carriage drive mechanism also includes a pair of digitally controlled electric drive motors individually operably coupled to the ball nuts in operable rotational driving relationship therewith for individually imparting rotational torque to the nuts.

A conventional programmable CNC controller having single axis and slave dual motor control capability, or two axis dual motor control capability, is programmed to synchronously control both motors for causing the ball nuts to conjointly produce computer controlled linear motion and positioning of the carriage along the stationary ball screw to effect one or more of the following operational results:

(1) developing anti-backlash preload forces between the ball nuts relative to the ball screw;

(2) producing an electromotive and/or frictional braking force for decelerating and/or holding the carriage in a selected stationarily fixed position relative to the machine tool along the line of action;

(3) causing the two motor rotors to exert rotational torque on the respectively associated ball nuts in opposite rotary directions in either or both carriage moving and stationary modes;

(4) dynamically adjusting preload forces exerted between the ball nuts via the ball screw by monitoring the load and/or position of each of the motors and adjusting the power input thereto individually to thereby adjust the preloading forces dynamically while producing conjoint rotary motion of the motors to drive the carriage along the ball screw; and (5) controlling the angular phase relationship between the motor rotors and hence between the ball nuts to thereby variably control the spread distance between the nuts within the range of system screw-to-nut backlash clearance in the carriage drive mechanism as a function of carriage travel position and/or mode of machine tool operation.

BRIEF DESCRIPTION OF THE DRAWINGS

The foregoing as well as other objects, features and advantages of the present invention will become apparent from the following detailed description of the best mode presently known for making and using the invention, as well as from the appended claims and accompanying drawings in which:

DETAILED DESCRIPTION OF THE PREFERRED EMBODIMENTS

Ball Screw Drive Mechanism

Figure 1:
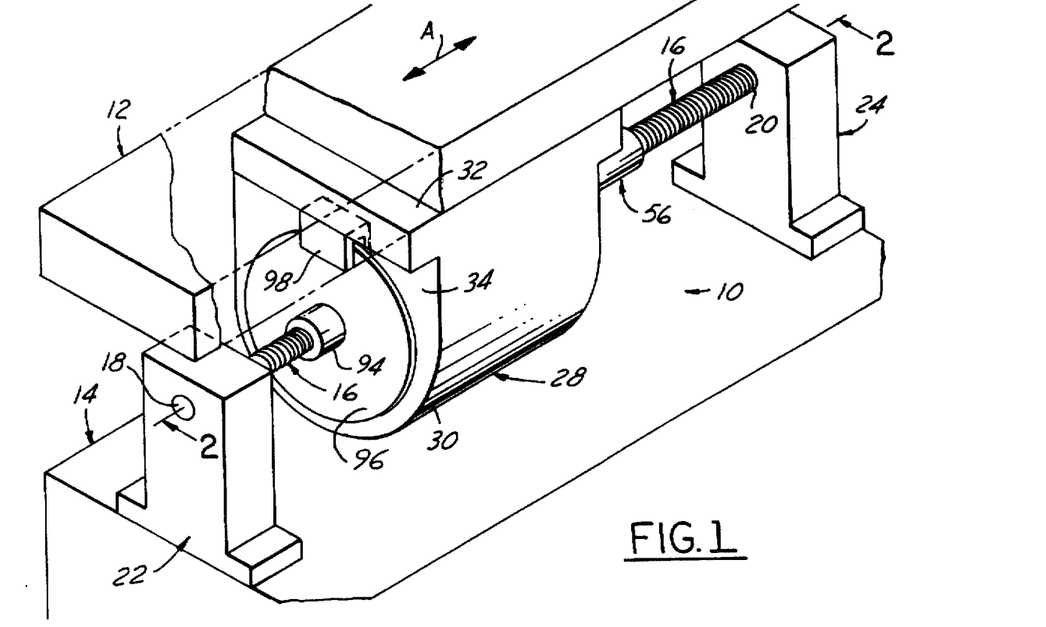
FIG. 1 is a simplified fragmentary semi-schematic perspective view of an exemplary but preferred embodiment of a ball screw drive system of the invention and operated in accordance with the method of the present invention, as embodied in a reciprocable work table carrying a ball screw drive unit of the invention for imparting axial travel to the work table relative to a base on which the worm screw of the drive is stationarily and non-rotatably mounted and affixed, with certain associated table support guideways not being shown for clarity of illustration.
Figure 2:
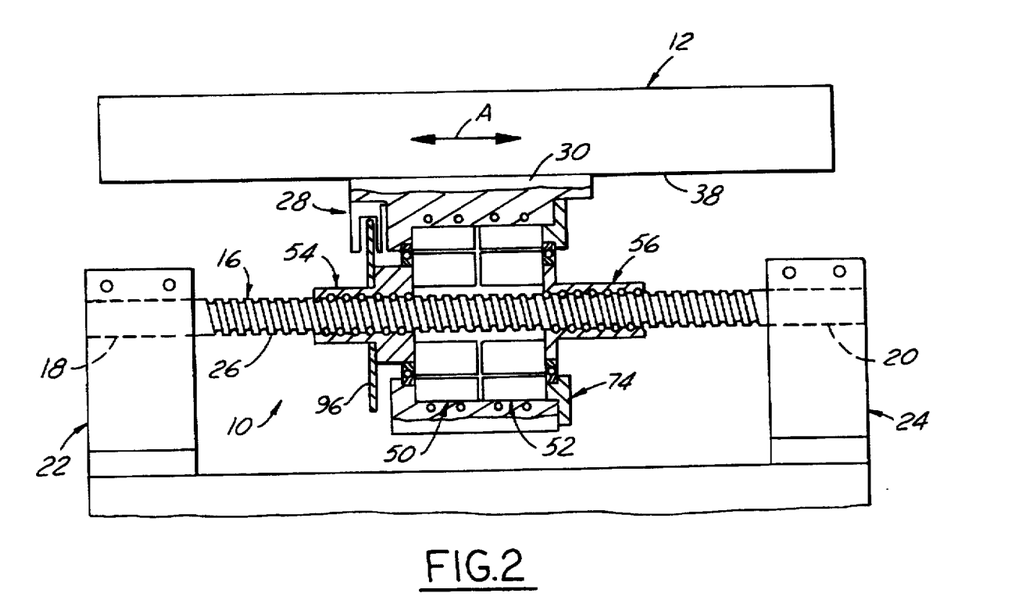
FIG. 2 is a vertical cross-sectional view taken on the line 2—2 of FIG. 1.
Figure 3:
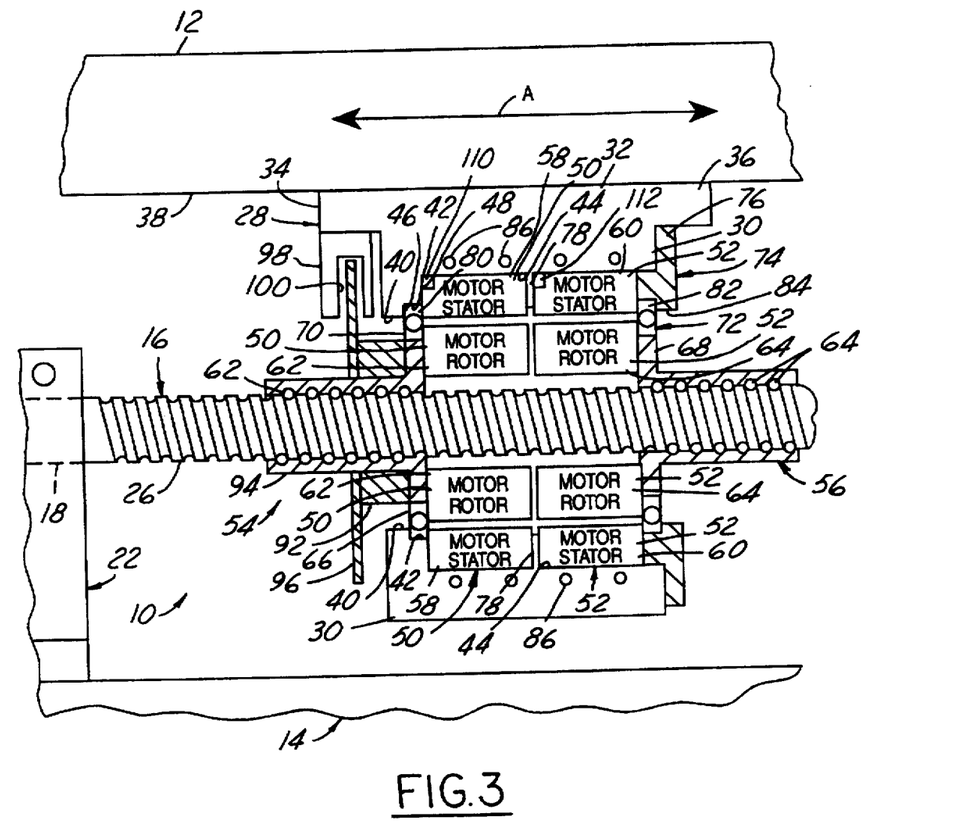
FIG. 3 is a simplified fragmentary semi-schematic cross-sectional view also taken on the line 2—2 of FIG. 1 but greatly enlarged over the showing of FIG. 2.

FIGS. 1, 2 and 3 illustrate a ball screw drive mechanism 10 for linearly reciprocating a workpiece-carrying table 12, slide or the like mounted on a base 14 in the travel direction indicated by the arrow A in FIGS. 1, 2 and 3. Table 12 is slidably guided and supported by suitable side guideways extending parallel to travel direction A (not shown) and conventionally affixed to and supported by base 14. Drive mechanism 10 includes a ball screw 16 having its axially opposite ends 18 and 20 securely supported against axial and rotational motion relative to base 14 by a pair of support posts 22 and 24 affixed to base 14. Ball screw 16 has a suitable ball screw thread form 26 extending substantially the entire distance between supports 22 and 24 and having a uniform pitch throughout its axial length.

As best seen in FIG. 3, drive mechanism 10 also includes a ball screw nut and motor housing assembly 28 that includes an outer casing 30 formed with a flat mounting head 32 at its upper end having laterally protruding flanges 34 and 36 for receiving mounting fasteners (not shown) securely affixing casing 30 to the underside 38 of table 12. Casing 30 is provided with a through-passageway coaxial with screw 16 and extending parallel to table travel direction A, and defined by stepped concentric cylindrical bores 40, 42 and 44 of progressively increasing diameter and providing annular shoulders 46 and 48 between bores 40 and 42, and 42 and 44 respectively.

In accordance with one principal feature of the present invention, a pair of automatically controlled servo motors 50 and 52 are mounted coaxially side-by-side in casing 30. Motors 50 and 52 are directly mechanically individually connected in rotational driving relationship with associated ball nuts 54 and 56 respectively. Motors 50 and 52 may be identical frameless-type stepping motors each respectively having a stationary outer stator 58 and 60 with associated field windings, and each respectively having a rotating inner permanent magnet rotor 62 and 64. Ball nuts 54 and 56 are preferably of standard ball nut construction respectively having an associated series of balls 62 and 64 operably entrained in a closed loop recirculating path defined by the associated external threads 26 of screw 16 and the internal threads of the associated ball nut. Ball nuts 54 and 56 each have an end mounting flange 66 and 68 respectively suitably directly affixed to the associated motor rotor 62 and 64 respectively for conjoint rotation and directly transmitting torsional forces therebetween. Rotors 50 and ball nut 54 are thus an integrated unitized subassembly, as are rotor 52 and ball nut 56, and these motor/nut subassemblies are individually journalled for rotation in casing 30 by an associated ball bearing assembly 70 and 72 respectively, with the inner races of the ball bearings suitably non-rotatably affixed to nut flanges 66 and 68 respectively.

Ball bearings 70 and 72 as well as stators 58 and 60 are captured in assembly in bores 42 and 44 of casing 30 by a retainer ring 74 having an outer flange 76 suitably non-rotatably secured by fasteners to the associated side of casing 30. An insulating and shielding spacer ring 78 is provided between stators 58 and 60. More particularly, the outer race 80 of ball bearing 70 is non-rotatably captured in casing bore 42 between shoulder 46 and stator 58, and the outer race 82 of ball bearing 72 is non-rotatably captured between motor stator 60 and an internal flange 84 of retainer ring 74. Ball bearing assemblies 70 and 72 may be conventional and need not be designed and/or mounted in assembly to impart any preloading thereto. Preferably casing 30 is made as a cast or fabricated aluminum component to serve as a heat sink for motors 50 and 52, and a suitable water cooling system is provided for circulating cooling water through cooling passages 86 provided in casing 30 in an encircling relationship to stators 58 and 60. Motors 50 and 52 are each provided with conventional built-in Hall effect devices 110 and 112 for electronic commutation of each associated motor.

Drive unit 10 also includes a feed back encoder subassembly 90 made up of a spacer collar 92 received on the sleeve portion 94 of nut 54 and affixed to nut flange 66 for rotation therewith, an emitter disc 96 axially positioned along sleeve 94 by collar 92 and affixed thereto for rotation therewith, and a sensor and emitter module 98 stationarily affixed to casing 30 for direct travel of the disc peripheral portion through the gap 100 of the module. The construction of emitter disc 96 and the sensor and emitter module 98 is conventional and available commercially to provide accurate indicia of the angular displacement occurring between emitter disc 96 and linear displacement of table 12 together with the associated casing 30, motors 50, 52 and nuts 54, 56. One example of a feed back encoder of this type is disclosed in the aforementioned U.S. Pat. No. 4,019,616, which is incorporated herein by reference.

Briefly, emitter disc 96 has a row of radially spaced holes or grooves for intermittently interrupting a light beam coming from a light emitting diode (not shown) provided in one side of module 98 to thereby interrupt the beam of light impinging on a photo transistor (not shown) mounted on the other side of the gap of module 98. Suitable electrical leads supply electrical current to and signals from the light emitting diode and sensing transistor to provide precise output signals indicating the degrees of rotation experienced by rotor 96, and consequently by nut 54. With the value of the degrees of angular rotation thus determined by disc 96, the electronic computer of the closed loop control system (described hereafter in conjunction with FIG. 4) is able to compute the linear displacement of table 12 against the stored given value of the pitch of ball screw thread 26. The intermittent interruption of the light beam of the module by the spaced grooves of the disc create pulsating electrical signals operably connected to the computer system which counts the periodic variations in the output signal to thereby feed back a precise indication of the amount of linear motion obtained from the control system.

Each of the motors 50 and 52 are likewise conventional and may be high torque brushless motors of the frameless type, such as those available from Inland Motor Division of Kollmorgen Corporation of Radford, Va. as its RBE(H) 04500 Motor Series. These motors provide high torque to weight and inertia ratios and are available with samarium cobalt rare earth magnets, either Delta or Wye three phase motor winding connections, and built-in Hall effect devices 110 and 112 for electronic commutation individually of motors 50 and 52.

General Operation and Advantages

In operation of drive mechanism 10 of the invention pursuant to the method of the invention, table 12 is linearly reciprocated in travel direction A in response to controlled rotation of ball nuts 54 and 56 as individually produced in response to the output torque of the associated motors 50 and 52 respectively, these dual rotary drives being carried by housing assembly 28 as a unit fixed to table 12 for bodily movement therewith. Servo motors 50 and 52 are electronically controlled stepper motors and are under the interrelated preprogrammed control of a computer implemented first embodiment of an electronic control system set forth in more detail hereinafter with reference to FIGS. 4 and 5. This system is operable to adjust "on the fly" the axial thrust forces exerted by and co-acting between ball nuts 54 and 56, and hence the preloading of the ball nuts relative to the ball screw 26, that is, such preloading can be dynamically adjusted while the mechanism is operating.

It is to be understood that, since ball nuts 54 and 56 are mechanically locked against axial travel relative to one another by ball screw 16 and their mounting in housing 28, except for whatever slight relative axial motion is permitted by the existence of backlash clearances between the nuts and screw, nuts 54 and 56 are mechanically constrained to rotate at the same angular velocity and rotary direction from zero to maximum RPM of the drive unit 10. Hence, except when taking up backlash in either axial direction, the nuts are mechanically coupled to be synchronized in phase as to their rotational direction and velocity along ball screw 16. However, the phase relationship of their respective output torques and/or angular position of the motor rotors, and hence ball nuts, relative to one another is electronically controllably varied in accordance with the two exemplary control system embodiments of the invention described in more detail hereinafter.

More particularly, motors 50 and 52 on the traveling assembly 28 are individually dynamically adjusted "on the fly" in an intermotor angular phase differential coordinated manner to control motion of traveling portion of drive 10 with respect to ball screw 16 and hence base 14.

Figure 4:
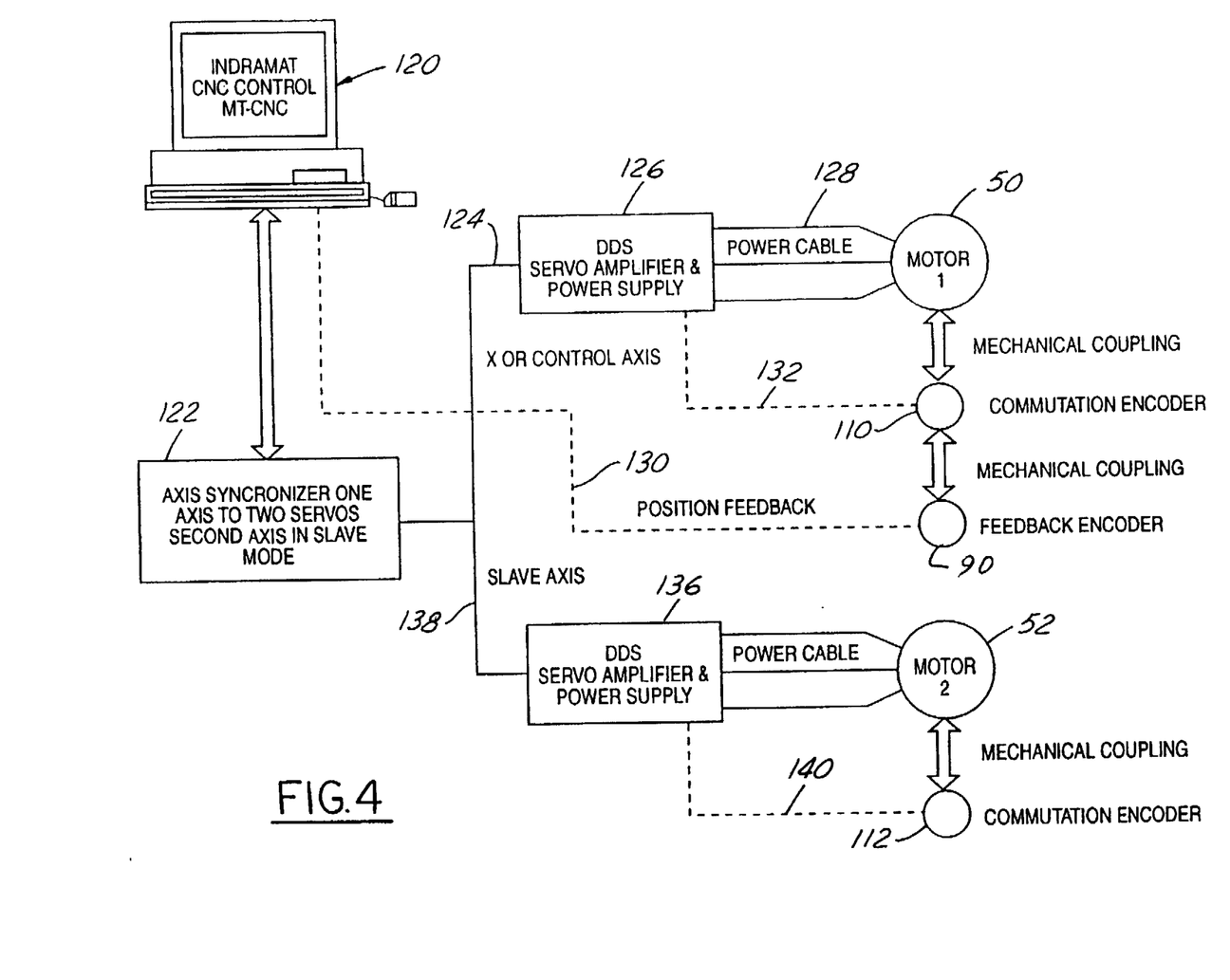
FIG. 4 is a schematic block diagram illustrating a first embodiment of a control system for performing the method of the invention in conjunction with the ball screw drive system of FIGS. 1–3.
Figure 5:
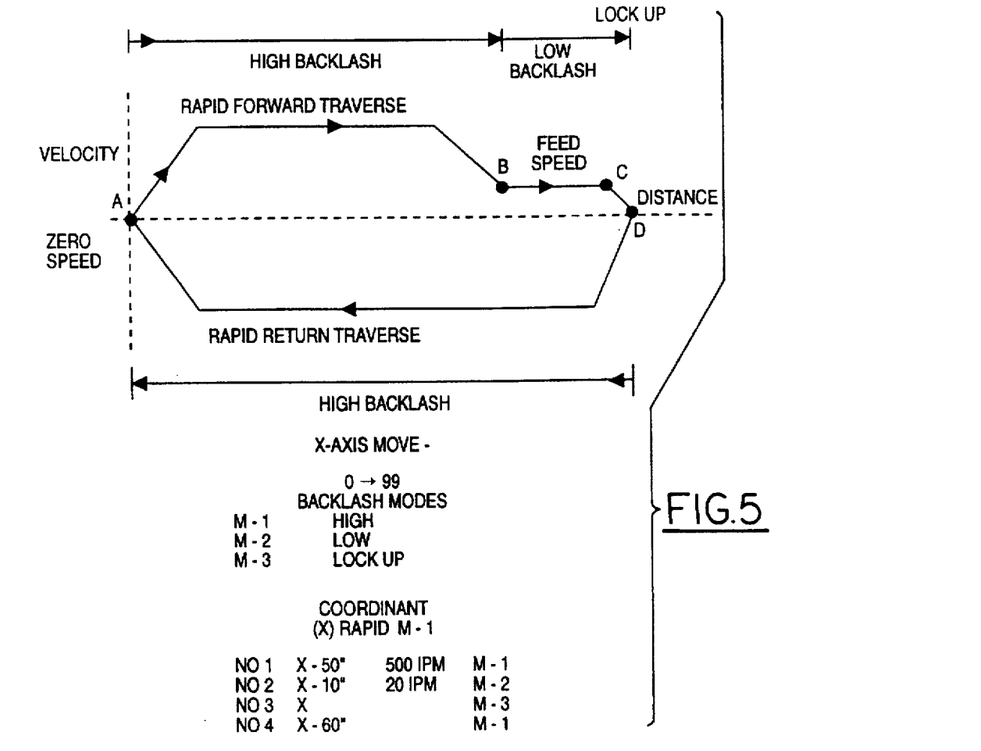
FIG. 5 is a diagrammatic plot of an exemplary work cycle operation to be performed utilizing the control system of FIG. 4.

In the system of FIGS. 4 and 5 the output torque of each of the two independently controlled servo motors 50 and 52, as well as their conjoint net table driving torque, is differentially controlled by electronically monitoring the input power to one motor such that input power to the second motor is dynamically adjusted relative to that of the first motor. A resulting additive or subtractive torque differential is created between the two motors that produces a predetermined resultant preload force between the ball nuts directed axially of ball screw 16. This differential power supply control system is also used to control lock-up of drive unit 10 as well as to provide an electric motor braking system without the need for any mechanical brake apparatus, by likewise controlling the torque differential produced by ball nuts 54 and 56 on screw 16.

Figure 6:
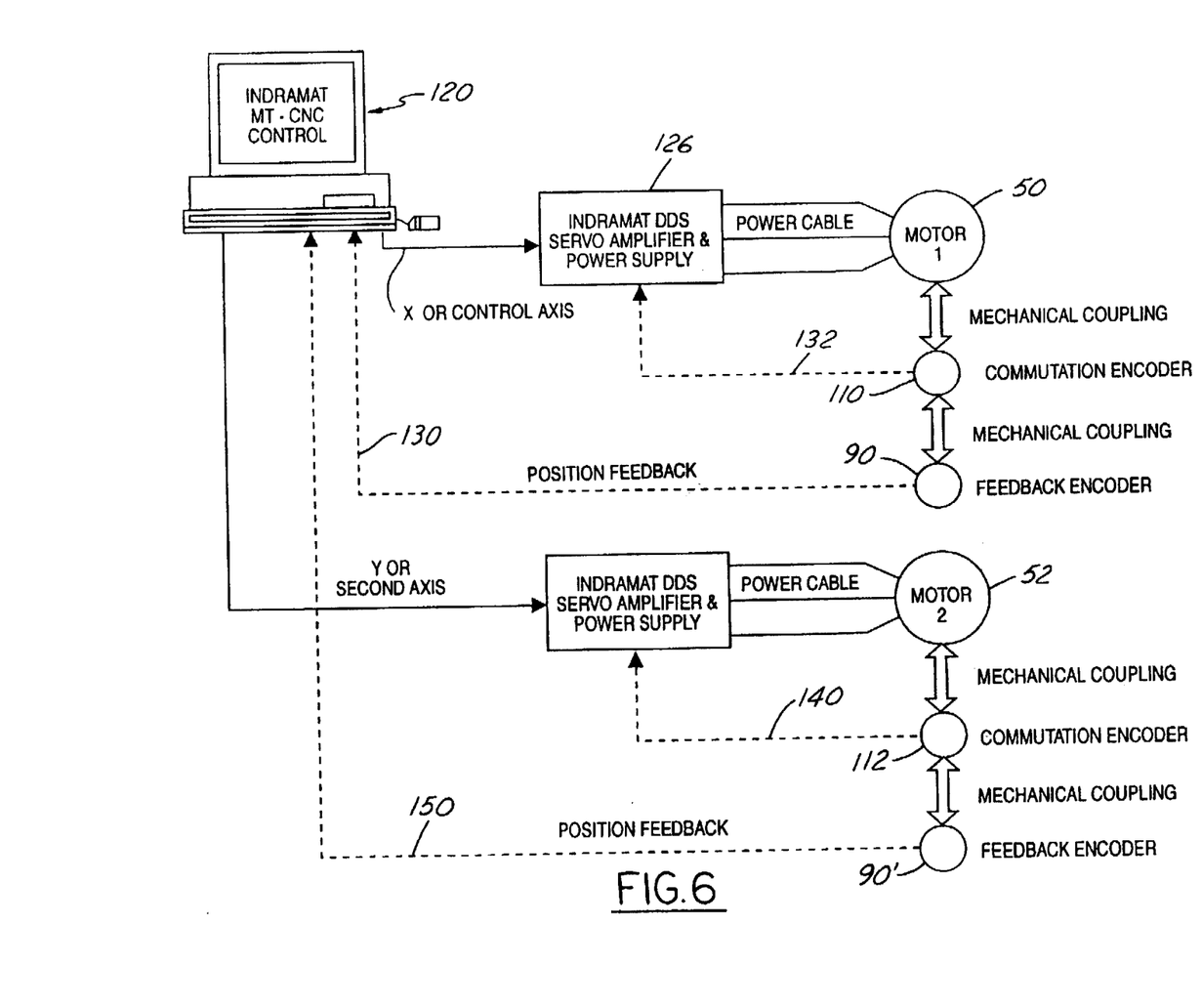
FIGS. 6 and 7 are views respectively similar to FIGS. 4 and 5 and respectively illustrating a second embodiment control system and exemplary work cycle operation thereof also in accordance with the invention.
Figure 7:
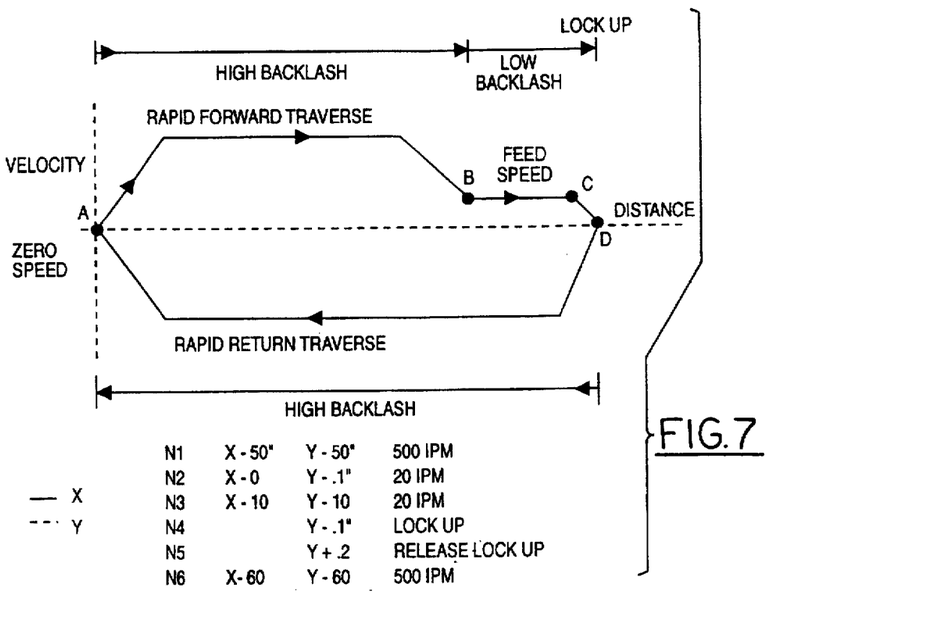

In the system of FIGS. 6 and 7 the conjoint rotor speed of motors 50 and 52 as well as their angular rotational phase relationship to one another about the axis of the screw 16 is controllably varied and adjusted to traverse table 12 in travel direction A and to release and apply a finite backlash clearance adjustment in order to vary the backlash take-up preload to the nuts 54 and 56.

In both system embodiments the output torque of each motor can be separately adjusted while the table is moving, and due to the stationary rigid mounting of ball screw 16, the nuts can be rotated up to high speeds, such as 3,000 rpm, without producing excessive vibration of the system. The provision of the two motors 50 and 52 under such interrelated control also doubles the peak motor power obtainable from drive unit 10 and thus its capability of achieving high acceleration and rapid traverse rates. As indicated previously, the integral design of the servo motors and associated ball nuts eliminates problems associated with gear or other indirect drive backlash, and the stationary, non-rotational mounting of ball screw 60 eliminates the problem of screw whip associated with rotating ball screw systems.

The manner in which motors 50 and 52 are controlled to achieve the aforementioned mode of operation and performance of the method of the invention will now be described in more detail.

Drive Unit Motor Control System

First Embodiment Control System

Referring to FIG. 4, a first embodiment of an electronic control system of the invention as operably electrically coupled to motors 50 and 52 is illustrated in schematic block diagram form. In this system a conventional, commercially available CNC control unit 120 is provided having the capability of at least a single axis motor control mode together with a slave axis motor control mode. Unit 120 may be that commercially available from Indramat Division of the Rexroth Corporation of Woodale, Ill. and sold under the trademark "INDRAMAT" Model MT-CNC-03. Control unit 120 is operably electrically coupled to an axis synchronizer unit 122 (which may be part of a built in SERCOS interface program) for single axis control to the two servo motors 50 and 52. The "X" or control axis is electrically coupled from synchronizer 122 via line 124 to a servo amplifier and power supply unit 126 of the digital drive system (DDS) type. The controlled power output from unit 126 is electrically coupled via power cables 128 to motor 50.

Motor 50 includes the feedback encoder 90 for providing a position feedback signal transmitted via line 130 back to control unit 120. The conventional built-in computation encoder 110 of motor 50 is utilized for commutation feedback via line 132 to DDS unit 126. Such components are available commercially from the aforementioned Indramat Division as their Model DDS/MDD Digital Intelligent AC Servo Drives with synchronous motors. In these systems the motor rotor position is closed loop controlled in the DDS drive itself. These units provide maximum positioning capability because of a feedback resolution of 1/2,000,000th of a revolution. Drive operating modes include position, speed and torque control.

Motor 52 is designated the "slave" motor in the FIG. 4 system and is electrically control coupled to the slave axis of synchronizer 122 through another digital drive system (DDS) servo amplifier and power supply 136 and associated control line 138. Motor 52 also has its built-in computation encoder 112 electrically coupled back to unit 136 via line 140.

FIG. 5 illustrates by way of example a typical plot of carriage travel, expressed as a dimensional distance measurements on the abscissa or X axis, versus carriage velocity, plotted as an ordinate values on the Y axis, to be programmed into the control system FIG. 4 for accomplishing this exemplary carriage travel work cycle with the ball screw drive system described previously in conjunction with FIGS. 1-3. In this cycle, motor drive for forward traverse of the carriage is plotted along the curve A-B-C-D that is thus a function of carriage travel distance versus carriage velocity in the forward direction from start point A to a predetermined carriage lockup point D. Return traverse of the carriage from point D back to point A is plotted by negative values to indicate reverse traverse drive in the opposite direction.

The forward traverse from point A to point B is programmed as a high velocity motion wherein full system backlash is present between the master and slave ball nuts 54 and 56 respectively. Forward traverse from points B to D is typically that which would be programmed for a carriage feed speed such as that used for a machine tool cutting operation. Hence for this portion of traverse a low or minimum backlash condition is programmed into the control system. Then when carriage 12 is decelerated near the last increment of this feed speed travel, indicated diagrammatically as the travel from points C to D in FIG. 5, the deceleration mode preprogrammed into control unit 120 in a conventional manner will automatically bring carriage 12 to a full stop at point D.

Once the carriage is at point D the control program causes unit 120 to operate motors 50 and 52 to apply further counter rotational torque to ball nuts 54 and 56 to take up all backlash in the system, and then to apply sufficient additional counter torque to cause frictional lock-up at point D of carriage drive 28 on ball screw 16. Hence the carriage is now held secure for an operation such as an end mill cut by a suitable machine tool carried by carriage 12. At the completion of the operation with the carriage held stationary at point D, the motor torque control program of the control unit reverses the lock-up torque produced by motor 52 to cause slave ball nut 56 to first reverse rotate relative to master nut 54 to release the anti-backlash forces therebetween. Then motors 58 and 52 are torque controlled to rapidly rotate in the reverse direction to conjointly apply unidirectional torque in the reverse direction to produce the rapid return traverse to point A, and in a high or full system backlash mode as the carriage is rapidly traversed from forward travel end limit point D back to its other travel end limit, i.e., starting point A.

To accomplish the foregoing example of carriage travel motion exemplified in the work cycle of FIG. 5, utilizing the control system of FIG. 4 and the drive system of FIGS. 1-3, it is only necessary to program four modes into the X axis program of control unit 120. The first mode would be for high or maximum system backlash for forward traverse from point A to point B, and would call for inputting in the travel program a given distance dimension of travel, such as 50 inches, and inputting some predetermined fast speed, such as 500 inches per minute. The torque command to each of motors 50 and 52 would be equal and in the same rotational direction, say to command 100% of the full torque from each motor. Hence during carriage travel from traverse point A to point B, full available drive power would be applied by both motors 50 and 52 to carriage 12, i.e., double the full driving torque individually produced by each motor 50 and 52, to thereby produce a rapid (e.g., 500 I.P.M.) traverse from point A to point B. Full system backlash would then be present between drive nuts 54 and 56 and hence a minimum friction condition would exist in the drive system mechanism 10.

The programmed controller 120 will automatically produce in a conventional manner the appropriate deceleration current signals to both motors 50 and 52 simultaneously to thereby decelerate carriage speed to the feed speed (e.g., 20 I.P.M.) when the carriage reaches point B.

The travel input program for traverse from points B to D would call for an X axis distance input of say 10 inches at an appropriate feed speed such as 20 inches per minute. The X-axis motor torque program for this stage of forward traverse would call for master or lead motor 50 to continue to apply 100% forward driving torque. However, the torque program command for slave motor 52 would call for a drive signal at a torque magnitude of only say 10%, and of opposite polarity so that slave motor 52 would develop such reverse torque in a rotational direction opposite to that of motor 50. Hence this torque reversal applied to slave motor 52 counter rotates nut 56 relative to nut 54, causing the nuts to spread apart to thereby take up system backlash therebetween. Thereafter, under these carriage feed control conditions, and due to the counter rotational torque drag force being applied by slave motor 52, the net motor driving torque applied to carriage 12 during its motion at feed speed in the traverse from points B to D would be reduced to 90% of the torque output of motor 50. Hence the net carriage traverse driving force would be reduced to 45% of total available system drive power. However, with system backlash thus removed, more precise control of carriage position, as determined by encoder feedback from master motor 50 and associated master drive nut 54, would be assured during the critical precision portion of the cycle, namely the work operation performed in the carriage traverse from point B to D.

To accomplish the lock-up condition at point D, control unit 120 would be programmed with a third torque mode input command that would require no distance or X input but would call for the torque program to continue to apply a 100% forward torque signal to motor 50, whereas a full 100% reverse torque signal now would be applied to slave motor 52. Hence nuts 54 and 56 would be forced further in a counter rotational direction relative to one another with full system motor torque drive power. Due to the mechanical advantage of the thread pitch of lead screw 16, against which the balls of the respective nuts are rotated, sufficiently high frictional forces are then developed, with such force multiplication, between the balls of the ball nuts and the respectively engaged opposite faces of the nut races and the lead screw thread to thereby frictionally lock-up carriage 12 on lead screw 16. Moreover, because the balls of lead nut 54 already were restrained against the adjacent trailing face of the lead screw thread by the low backlash drag torque applied during work traverse from point B to point D, further tightening of the balls of lead ball nut 54 against this same thread face during application of full counterrotational lock-up torque between the nuts will not shift the carriage relative to the lead screw. Therefore even during shift to lock-up mode the carriage position remains precisely controlled from the master drive motor 50 and its position encoder feedback.

To program control unit 120 for the rapid return traverse from point D to point A, a fourth travel control command is inputted to control unit 120, i.e., a distance value on the X axis equal to the full forward traverse distance, i.e., 60 inches in the foregoing example. The torque directional value command would, of course, be negative, that is reversed from that inputted for forward traverse from point A to point D. An initial release-lock-up command also would be programmed to initiate application of reverse travel driving force first to master motor 50 to initially counter rotate nuts 54 and 56 in the reverse direction from that applied during lock-up mode to release the spread-apart lock-up forces being exerted between the nuts. Then the controller 120 would be programmed to apply full reverse driving torque to both motors 50 and 52 to thereby cause rapid return traverse from point D to point A at full system drive capability, equal to the sum of the maximum driving torque of master motor 50 and slave motor 52. Hence during return traverse from point D to point A the ball nuts would be operating with full backlash clearance availability therefore and under very low friction conditions, i.e., a high backlash or "full slop" mode identical to the rapid forward traverse from point A to B but in the reverse direction of carriage travel.

It will thus be seen that in accordance with the mode of operation of the ball nut load screw drive system of the invention, as so controlled in accordance with the system embodiment exemplified in FIGS. 4 and 5, rapid traverse is achievable with full system power developed by the additive driving torque outputs of both the master and slave motors 50 and 52, thus rendering the carriage capable of driving twice the load of a single motor, or, alternatively, allowing the size of the motors to be correspondingly reduced for a given maximum traverse load condition. Moreover, rapid forward traverse from point A to point B, and reverse traverse from point D back to A is accomplished with the nuts having a freedom of relative axial motion therebetween equal to the full range of the backlash clearance of the system. Hence in the work cycle example of FIG. 5 the system operates with minimal frictional resistance for 110 inches out of total travel of 120 inches. As a result, the heat of friction developed by the drive nuts on screw 16 is substantially reduced so that the problems caused by ball screw heating are correspondingly reduced if not eliminated. In addition, frictional wear of the ball nut races, of the faces of the thread of lead screw 16 and of the ball nuts themselves is likewise significantly reduced, thereby providing a corresponding reduction in maintenance costs and improvements in system accuracy, efficiency and operational service life.

In addition, precise control of the position of carriage 12 during work traverse from point B to point D is assured, as well as accurate positional lock-up at point D without the need for any system brake and/or ball nut backlash take-up shims to accomplish these improved results.

Second Embodiment Control System

FIG. 6 illustrates a second embodiment of a control system provided in accordance with the invention for accomplishing an exemplary work program indicated diagrammatically by the work cycle plot of FIG. 7. The control system shown in FIG. 6 is similar to that shown in FIG. 4 except that motor 52 is also provided with a position feedback encoder 90' identical to encoder 90, to provide a position feedback signal from slave motor 52 that is electrical coupled via line 150 to control unit 120. The two-axis control capability of unit 120 is thus utilized in this embodiment, i.e., both X axis and Y axis, with the X axis commands being transmitted to master motor 50 and the Y axis used as a second control axis to control slave motor 52. By so coupling motor 52 on the second axis controller with its own feedback encoder and position feedback signal for closed loop control of motor 52, it now becomes possible in accordance with the invention to precisely control the angular phase relationship between the associated master ball nut 54 and slave ball nut 56 by merely utilizing the existing two-axis programmable control capabilities of the commercially available control unit 120.

Referring to the FIG. 7, the assigned work cycle operational task for the drive system will be seen to be, for convenience, identical to that programmed in FIG. 5. However the FIG. 6 system operational mode inputs for control 120 are somewhat different. To accomplish the rapid forward traverse from point A to point B of carriage 12, the first mode indicated as N–1 in FIG. 7 would call for an X axis travel distance input of 50 inches. A Y axis input of 50 inches would also be programmed. The velocity or speed input for each of the motors would be the same, say again at 500 inches per minute. The torque mode input commands for X and Y axis would call for say equal and full torque in the forward direction to be applied to each of the motors 50 and 52, as in the first embodiment system of FIGS. 4 and 5.

However, with the system of FIGS. 6 and 7, the precise position of slave motor 52 and the associated ball nut 56 is now a known quantity because of the position feedback signal from feedback encoder 90' to control unit 120. More importantly, the precise phase relationship in terms of angular degrees of rotation of nuts 54 and 56 relative to one another is now also a known quantity at control 120. Hence at set up of the system of FIGS. 6 and 7 a zero set point of phase angle between nuts 54 and 56 can be established. For example, this zero phase angle can be set such that balls 62 and 64 of each nut are essentially centered between the respective opposite faces of the screw thread 26 of lead screw 16. Carriage 12 theoretically could then float back and forth in either traverse direction for half the backlash clearance distance of the system. This set point condition is then programmed in as a zero phase, full backlash mode command for control unit 120.

With the control system of FIG. 6 so programmed, the initiation of the forward traverse command to move the carriage over from point A to point B would cause full torque to be applied to each of the motors 50 and 52, and in the same rotational direction, to thereby drive carriage 12 from point A to point B at maximum velocity capability. In this traverse the phase relationship of zero is maintained between motors 50 and 52 and their associated ball nuts so that nut ball-to-screw thread freedom of full system backlash is available. Therefore minimal frictionally generated heat and wear is developed during this portion of the work cycle, as in the system of FIGS. 4 and 5.

The carriage is again program decelerated to the feed speed at point B. Upon reaching this travel position the X and Y axis input program commands for achieving the slower carriage feed speed from point B to point D, previously inputted to each of the control axis programs of the control 120, cause the forward velocity input to each motor to be the same, say 20 inches per minute.

However the phase mode command input for point B is programmed to counter rotate slave nut 56 relative to master nut 54 through a given angular range of relative rotation therebetween. The appropriate program sequence is also inputted to initiate this phase shift at point B prior to initiation of the velocity and distance traverse mode commands for traverse from point B to point D. For example, if full take-up of system backlash clearance distance between nuts 54 and 56 required say 90° of relative rotation from the zero phase set point of nuts 54 and 56, the phase shift command at point B might call for a 45° phase shift between the nuts in a counterrotational direction. Preferably, this command for counterrotation is applied only to slave motor 52. This would command slave motor 52 to "screw" the trailing nut 56 that much closer to lead nut 54 so as to take up half the backlash clearance therebetween. This phase shift command setting is, of course, adjustable, depending upon the requirements of the work to be accomplished during the slow feed traverse from point B to point D.

After the nut phase shift at point B has been accomplished, the synchronous forward traverse commands would be initiated simultaneously to each of the motors 50 and 52 for traverse from point B to point D, i.e., the same distance input of say 10 inches and the same speed input of say 20 inches per minute. Hence during this feed drive mode from point B to point D the torque command for each motor would be for the same direction of motor rotation. Moreover, each motor can be given a full driving torque command, if needed or desired. Alternatively, a reduced but equal torque command can be given to each of the motors 50 and 52 during this mode, depending upon the load conditions to be encountered in achieving this portion of the work cycle. Hence the work feed traverse from point B to point D of the carriage is again accomplished with substantially reduced system backlash to thereby ensure precisional carriage positioning by system positional closed loop feedback control of motor 50 from encoder 90 to controller 120. However, this is accomplished without the need to introduce slave motor counter-torque-induced drag forces into the drive system as is done in the FIG. 4 system embodiment. Slave motor 52 is thus fully available in all system backlash modes for producing carriage traverse propulsion forces.

When carriage 12 reaches the end of forward traverse at point D a further system mode command for lock-up takes effect. The lock-up command in the system of FIGS. 6 and 7, as distinguished from the system of FIGS. 4 and 5, is a differential phase relationship command rather than a differential torque command. Indeed, throughout the various modes of carriage travel in the system of FIGS. 6 and 7, except at the sequence points where phase shift is changed between motors 50 and 52 under precise control from controller 120, the respective torque commands to motors 50 and 52 are preferably always additive and usually equal to one another. This becomes achievable because the amount of backlash in the system is controlled as a function of the control of angular phase relationship between nuts 54 and 56, which translates into a given spread distance between nuts 54 and 56 axially of ball screw 16. In the system of FIG. 6, as exemplified by the work cycle in FIG. 7, precise control of the backlash clearance is thus obtained for any and all portions of the carriage traverse cycle by precisely setting the distance between nuts 54 and 56 as a function of their angular phase relationship and the pitch of the screw thread of lead screw 16. The magnitude of ball screw drive backlash thus can be precisely controlled and varied as desired, either bringing the nuts closer together or spreading them farther apart, in response to the appropriate phase shift command given to motor 52 relative to that of motor 50.

By contrast, in the first embodiment system of FIGS. 4 and 5 a counterrotational EMF is generated in slave motor 52 to thereby introduce a drag force into the drive system, tending only to pull nuts 54 and 56 apart to thereby take up backlash clearance. Frictional drag is thus controllably introduced into this first embodiment system as a substractive force from the carriage driving force applied by master motor 50.

When carriage 12 reaches point D and the lock-up mode signal is applied to motors 50 and 52 from control unit 120, the phase shift angle difference is thereby increased, from say 45° to 90° in the foregoing example. Depending upon the direction of counter rotation chosen for introducing phase shift from the zero set point, introducing this further increment of full phase shift to lock-up condition will either spread nuts 54 and 56 as far apart or pull them tightly together as far as backlash clearance will allow. The associated torque commands to motors 50 and 52 at lock-up may also be inputted to increase the magnitude of counter rotational torque applied by motors 50 and 52, and equalized in opposite rotational directions, to thereby set the degree of frictional resistance as desired to achieve the desired magnitude of full frictional lock-up of carriage 12 on screw 16 (but staying within, of course, the load and stress limits of drive mechanism 10).

To initiate carriage return traverse from point D to point A controller 120 is further programmed accordingly in the second embodiment system with separate X and Y coordinate distances for the separate but synchronized control X axis and Y axis, the Y axis being used as a second axis for controlling slave motor 52. The same total return distance (60 inches in the foregoing example) is thus inputted for the control program for each of the motors 50 and 52. The same rotational velocity command is also inputted for each motor, for example the 500 inch per minute velocity of the example of FIG. 7.

However, in this return traverse segment of the cycle sequence the phase shift program is sequenced to initiate first to thereby reduce the phase shift from the foregoing 90° lock-up condition back to the zero set point phase relationship between nuts 54 and 56. This again positions the nuts so that their respective balls 62 and 64 are positioned with a spread distance which is substantially at the midpoint of the backlash clearance range between the associated load screw thread faces.

Then the drive command is initiated according to the foregoing reverse traverse program modes to cause carriage 12 to be driven back from point D to point A by the drive system motors 50 and 52. Preferably equal torque driving input commands are programmed for motors 50 and 52, up to 100% of the torque output capacity of each motor if it is desired to produce maximum return traverse acceleration and/or velocity. This return traverse thus again occurs under a high ("loose") backlash condition between the ball nuts and screw so that generation of frictional heat and ball nut and screw wear is thereby minimized. This result is achieved by maintaining the zero set point phase relation positional control of the nuts by the two-axis motor control synchronization of controller 120 throughout this return traverse from point D to point A.

It will thus now be seen that the second embodiment system, exemplified by the control system of FIG. 6 to accomplish the task of FIG. 7, provides additional advantages over the first embodiment system of FIGS. 4 and 5. The dimensional range of system backlash can be precisely controlled as needed in the various modes of carriage travel. The second embodiment system also operates without introducing any drag forces on the drive system during carriage traverse. The electro-mechanical drive system of FIGS. 1–3 thus can be utilized to maximum advantage to obtain full power capability for carriage travel by using the full power of both motors 50 and 52 in an additive fashion, while still continuously retaining the capability of precisely and variably controlling the amount of backlash as a function of phase relationship between the ball screw nuts 54 and 56. Hence full power is available from both motors to drive carriage 12 even in a low backlash, slow-feed mode. Operating power requirements of the system motors are thus individually reduced, and greater efficiency as well as system flexibility is thereby obtained.

System cost is not significantly increased because the addition of a feedback encoder 90' to motor 52 is available at minimum cost as already incorporated in the commercially available liquid-cooled frameless induction motors adapted for digital command control. Such equipment is commercially available with a wide speed control range, say from 0.0001 rpm to 25,000 rpm, with high position resolution, say up to one four millionth of a revolution. These frameless motors also offer the aforementioned savings by the elimination of motor transmission, built-in drive gears and separate spindle position encoder, and provide liquid cooling for low-temperature operation of the motor and machine. Such motors also offer high static and dynamic speed accuracy as well as continuous and peak motor torque, even at standstill.

The system of FIGS. 6 and 7 also offers the possibility of converting the slave motor 52 to a drag mode if desired to operate the drive system to produce a carriage drive electro-mechanical friction braking action, thereby also eliminating the need for a separate system friction brake mechanism.

In both systems positional accuracy of carriage 12 is enhanced because operational heat generated on ball screw 16 is substantially reduced. Hence the problem of positional error introduced by expansion and contraction of heated ball screws is reduced if not eliminated. Both systems offer the possibility of utilizing either smaller motors to work against a given rapid traverse applied load for a given work task, or without changing motor size increasing the rapid traverse load capabilities of the system. Work cycle time can thus be reduced by increasing rapid traverse speed and hence reducing elapsed time of rapid traverse periods in the work cycle. Machine tool systems utilizing the drive and control systems of the invention thus can be operated more efficiently from the standpoint of cycle time and power requirements as well as more accurately over a longer life cycle.

I claim:

1. Linear motion drive apparatus for a moving element for a machine tool, comprising in combination:
    a movable mounted carrier adapted for movably carrying an operative machine tool working element along a line of action within said machine tool;
    a threaded screw fixedly non-rotatably mounted in said machine tool parallel to, and at least as long as, said line of action to be traversed by said carrier;
    first and second threaded nuts laterally restrained in and mounted for free rotation thereof in said carrier and threadably and concentrically engaging said screw in laterally spaced apart relationship therealong and with a given maximum backlash thread clearance between said nuts and screw;
    first and second electric motors each having a rotor, a stator and casing, said rotor, stator and casing of said first and second motors being respectively assembled concentrically with one another and coaxially with said first and second nuts respectively;
    said rotors of said first and second motors being non-rotatably affixed respectively to said first and second nuts to individually directly rotate said nuts;
    said casing of said first and second motors being affixed to said carrier to prevent rotation of said casing;
    a support on which said movably mounted carrier is operably engaged and supported for permitting motion of said carrier in a direction parallel to said screw; and
    a power control for applying electrical power individually to said first and second motors to simultaneously cause each said motor to produce rotational output torque for individually rotationally driving said first and second nuts in the same or opposite rotational directions for controlling conjoint linear motion thereof and of said motors and carrier along said screw and controllably varying the backlash thread clearance from said maximum clearance to zero clearance.

2. The drive apparatus of claim 1 wherein said power control is operable to cause said first and second nuts to produce a variable torque differential therebetween for developing screw-transmitted reaction forces therebetween to produce one or more of the following modes of operation of said drive apparatus:
    (a) developing anti-backlash pre-load forces between said first and second nuts relative to said screw;
    (b) producing a braking force for holding said carrier stationarily in one or more selected fixed positions relative to said machine tool along the line of action;
    (c) causing said first and second motor rotors to variably exert rotational torque on said associated first and second nuts in the same and/or opposite rotary directions; and
    (d) dynamically adjusting pre-load forces exerted between said first and second nuts via said screw by monitoring the load of each of said first and second motors and adjusting the power input thereto individually to thereby adjust the pre-loading forces dynamically while producing the conjoint motion of said motors and carrier along said screw.

3. The apparatus set forth in claim 2 wherein said power control includes a closed loop control system for regulating power input individually to said first and second motors and includes a positional feedback encoder operatively associated with said casing and said nut of at least one of said motors for providing electrical signal indicia in response to rotation of said associated nut on said screw for conversion by said control to linear motion position relationship between said carrier and said screw.

4. The drive apparatus set forth in claim 3 wherein said first and second nuts and said screw are of the recirculating ball screw and nut type.

5. The drive apparatus set forth in claim 4 wherein said first and second motors are servo type with built-in electronic commutators and permanent magnet rotors.

6. The drive apparatus set forth in claim 5 wherein said casing of said first and second motors comprises a common unitary body having each of said first and second motor stators fixedly non-rotatably carried therein.

7. The drive apparatus set forth in claim 6 wherein said common casing body has a bore concentric with the axis of said screw coaxially receiving said first and second motors in side-by-side relationship therein.

8. The apparatus set forth in claim 1 wherein said power control includes a closed loop control system for regulating power input individually to said first and second motors and includes a first feedback encoder operatively associated with said casing and first nut for providing electrical signal indicia in response to rotation of said first nut on said screw for conversion by said control to linear motion position relationship between said carrier and said screw, and a second feedback encoder operatively associated with said second nut for providing electrical signal indicia in response to rotation of the second nut on the screw for conversion by the power control to linear motion position relationship between the carrier and the screw, and wherein the power control is operable to detect and control the angular phase relationship between said nuts to variably control the amount of backlash clearance between the nuts and screw by changing the phase relationship between said nuts.

9. The apparatus set forth in claim 8 wherein said first and second nuts and said screw are of the recirculating ball screw and nut type.

10. A method of controlling linear motion and position of a moving working element carried on a movably mounted carrier operable for carrying the working element along a line of action, comprising the steps of:
  (a) providing a threaded screw fixedly non-rotatably mounted parallel to and at least coextensive with the line of action to be traversed by the carrier;
  (b) providing first and second threaded nuts laterally restrained in and mounted for free rotation thereof in the carrier and threadably and concentrically engaging the screw in laterally spaced apart relationship axially therealong and with a given maximum backlash thread clearance between said nuts and screw;
  (c) providing first and second electric drive motors for supplying rotational torque power to the first and second nuts respectively;
  (d) individually operably mechanically coupling the first and second motors respectively to the first and second nuts in operable rotational driving relationship therewith for individually imparting rotational torque to the nuts; and
  (e) individually regulating the power input to the first and second motors for causing the nuts to conjointly produce linear motion and positioning of the carrier along the screw and for controllably varying the backlash thread clearance from said maximum clearance to zero clearance to effect one or more of the following operational modes:
    (1) developing anti-backlash pre-load forces between the first and second nuts relative to the screw;
    (2) producing an electromotive and/or frictional braking force for holding the carrier in a selected stationarily fixed position along the line of action;
    (3) causing the first and second motor rotors to simultaneously exert rotational torque on the respectively associated first and second nuts in the same or opposite rotary directions;
    (4) dynamically adjusting pre-load forces exerted between the first and second nuts via the screw by monitoring the load and/or position of each of the first and second motors and adjusting the power input thereto individually to thereby adjust the pre-loading forces dynamically while producing conjoint motion of the motors and carrier along the screw, and
    (5) controlling the angular phase relationship between the motors and hence between the nuts to thereby variably control the amount of backlash between the nuts within the range of system screw-to-nut backlash clearance.

11. The method set forth in claim 10 wherein step (e) is performed by providing a power control that includes a closed loop control system for regulating power input individually to the first and second motors and providing a first feedback encoder operatively associated with the first nut for providing electrical signal indicia in response to rotation of the first nut on the screw for conversion by the power control to linear motion position relationship between the carrier and the screw.

12. The method as set forth in claim 11 wherein step (e) is performed by causing the second motor to supply rotational torque to the second nut in the opposite rotational direction as the first motor is caused to apply torque to the first nut during motion of the carrier to thereby effect the aforesaid operational modes.

13. The method as set forth in claim 11 wherein step (e) is further performed by providing a second feedback encoder operatively associated with the second nut for providing electrical signal indicia in response to rotation of the second nut on the screw for conversion by the power control to linear motion position relationship between the carrier and the screw, and wherein the power control is operated to detect and control the angular phase relationship between the nuts to variably control the amount of backlash between the nuts and screw by changing the angular phase relationship between the nuts.

14. The method set forth in claim 11 wherein the first and second nuts and the screw are of the recirculating ball screw and nut type.

15. The method set forth in claim 12 wherein the first and second nuts and the screw are of the recirculating ball screw and nut type.

16. The method set forth in claim 13 wherein the first and second nuts and the screw are of the recirculating ball screw and nut type.

17. The method set forth in claim 11 wherein the first and second motors are servo type with built-in electronic commutation and permanent magnet rotors.

18. The method set forth in claim 12 wherein the first and second motors are servo type with built-in electronic commutation and permanent magnet rotors.

19. The method set forth in claim 13 wherein the first and second motors are servo type with built-in electronic commutation and permanent magnet rotors.

20. The method set forth in claim 11 wherein the first and second motors are encased in a common unitary body having a stator of each of the first and second motors fixedly non-rotatably carried therein.

21. The method set forth in claim 12 wherein the first and second motors are encased in a common unitary body having a stator of each of the first and second motors fixedly non-rotatably carried therein.

22. The method set forth in claim 13 wherein the first and second motors are encased in a common unitary body having a stator of each of the first and second motors fixedly non-rotatably carried therein.

23. A method of constructing a drive mechanism system operable for controlling linear motion and position of a drive unit and an associated linear member relative to one another along a line of action, comprising the steps of:
  (a) providing an elongated rigid linear member having a row of teeth and being non-rotatably mounted parallel to and extending linearly along the line of action;
  (b) providing a drive unit having first and second threaded nuts laterally restrained in and mounted for free rotation thereof in the drive unit and individually threadably engaging the teeth of the linear member in laterally spaced apart relationship with a given maximum backlash clearance between the nuts and teeth;
  (c) providing first and second electric drive motors in the drive unit for supplying rotational torque power to the first and second nuts respectively;
  (d) individually operably mechanically coupling the first and second motors respectively to the first and second nuts in operable rotational driving relationship therewith for individually imparting rotational torque to the associated nuts; and
  (e) providing a power control system operable for individually regulating the power input to the first and second motors for causing the nuts to conjointly produce relative linear motion and relative positioning of the drive unit relative to the linear member and for controllably varying the backlash clearance from maximum to zero to effect one or more of the following operational modes:
(1) developing anti-backlash pre-load forces between the first and second nuts relative to the linear member;
(2) producing an electromotive and/or frictional braking force for holding drive unit and the linear member in a selected stationarily fixed position relative to one another along the line of action;
(3) causing the first and second motor rotors to simultaneously exert rotational torque on the respectively associated first and second nuts in the same or opposite rotary directions;
(4) dynamically adjusting pre-load force exerted between the first and second nuts via the linear member by monitoring the load and/or position of the drive unit relative to the screw and adjusting the power input thereto individually to thereby adjust the pre-loading forces dynamically while producing conjoint motion of drive unit relative to the linear member, and
(5) controlling the angular phase relationship between the motors and hence between the nuts to thereby variably control the amount of backlash between the nuts within the range of system linear member teeth-to-nut backlash clearance.

24. The method set forth in claim 23 wherein step (e) is performed by providing in the power control system a closed loop control system operable for regulating power input individually to the first and second motors and providing a first feedback encoder operatively associated with the first nut for providing electrical signal indicia in response to rotation of the first nut on the linear member teeth for conversion by the power control system to relative linear motion position relationship between the drive unit and the linear member.

25. The method as set forth in claim 24 wherein step (e) is performed by causing the second motor to supply rotational torque to the second nut in the opposite rotational direction as the first motor is caused to apply torque to the first nut during linear motion of the drive unit relative to the linear member to thereby effect the aforesaid operational modes.

26. The method as set forth in claim 24 wherein step (e) is further performed by providing a second feedback encoder operatively associated with the second nut for providing electrical signal indicia in response to rotation of the second nut for conversion by the power control to linear motion position relationship between the drive unit and the linear member and wherein the power control is operable to detect and control the angular phase relationship between the nuts and linear member teeth by changing the angular phase relationship between the nuts.

27. The method set forth in claim 25 wherein the first and second nuts and the linear member are of the recirculating ball screw and nut type.

28. The method set forth in claim 26 wherein the first and second nuts and the linear member are of the recirculating ball screw and nut type.

* * * * *